(12) United States Patent
Lohle et al.

(10) Patent No.: US 8,100,351 B2
(45) Date of Patent: Jan. 24, 2012

(54) METHOD AND DEVICE FOR GRINDING HOT, WET RAW MATERIAL

(75) Inventors: Willy Lohle, Neuss (DE); Hans Bonk, Muehlheim (DE); Franz-Josef Heuken, Moenchengladbach (DE)

(73) Assignee: Loesche GmbH, Duesseldorf (DE)

( * ) Notice: Subject to any disclaimer, the term of this patent is extended or adjusted under 35 U.S.C. 154(b) by 631 days.

(21) Appl. No.: 11/989,762

(22) PCT Filed: Jul. 19, 2006

(86) PCT No.: PCT/EP2006/007122
§ 371 (c)(1),
(2), (4) Date: Mar. 3, 2009

(87) PCT Pub. No.: WO2007/022837
PCT Pub. Date: Mar. 1, 2007

(65) Prior Publication Data
US 2010/0043675 A1 Feb. 25, 2010

(30) Foreign Application Priority Data
Aug. 26, 2005 (DE) .......................... 10 2005 040 519

(51) Int. Cl.
*B02C 23/22* (2006.01)

(52) U.S. Cl. .............................. 241/19; 241/23; 241/119

(58) Field of Classification Search .......... 241/117–121, 241/65, 23, 18, 19, 79.1
See application file for complete search history.

(56) References Cited

U.S. PATENT DOCUMENTS

| | | | |
|---|---|---|---|
| 3,608,839 A | 9/1971 | Fagerholt |
| 4,009,992 A | 3/1977 | Eicke |
| 4,090,671 A | 5/1978 | Kartman |
| 4,597,537 A | 7/1986 | Misaka et al. |
| 5,353,997 A | 10/1994 | Kasseck et al. |
| 6,276,620 B1 | 8/2001 | Poeschl |

FOREIGN PATENT DOCUMENTS

| | | |
|---|---|---|
| DE | 2361060 A1 | 6/1975 |
| DE | 406644 B1 | 11/1994 |
| DE | 19836323 C2 | 11/2000 |
| EP | 0579214 A1 | 1/1994 |

*Primary Examiner* — Mark Rosenbaum
(74) *Attorney, Agent, or Firm* — Jacobson Holman PLLC

(57) ABSTRACT

The invention relates to a method and a device for grinding hot, wet raw material.
The invention is particularly suitable for the cement industry and the grinding and simultaneous drying of cement clinker, slag and aggregates. In order to achieve a throughput increase and energy saving, as well as an improvement in the product quality, particularly with mixed cements, there is a simultaneous grinding and drying through a controlled supply of a cooling gas in the upper mill part with a relatively high hot gas inlet temperature in the lower mill part. The cooling gas supplies ensures a predetermined gas-product temperature downstream of the classifier and replaces or significantly reduces the disadvantageous cooling water injection.

16 Claims, 2 Drawing Sheets

METHOD AND DEVICE FOR GRINDING HOT, WET RAW MATERIAL

CROSS-REFERENCE TO RELATED APPLICATIONS

This is a national stage of International application No. PCT/EP2006/007122 filed on Jul. 19, 2006 and published in German.

BACKGROUND OF THE INVENTION

1. Field of the Invention

The invention relates to a method for grinding hot, wet raw material according and to a device for grinding hot, wet raw material.

The invention particularly applies to the cement industry for grinding and simultaneously drying raw materials, such as cement clinker, slag and aggregates.

2. Related Art

It is known that for such mill drying processes vertical mills with integrated or mounted classifiers, particularly Loesche-type air-swept roller mills, are particularly suitable. Grinding systems with vertical mills can be operated in compound with rotary kilns and in addition the waste gases from the heat exchanger and clinker cooler process can be used for mill drying and, for the pneumatic conveying of the milled material.

DE 198 36 323 C2 describes methods and plants for the production of cement using a vertical mill.

Besides the mill drying of raw powder in an air-swept roller mill, DE-AS 23 61 060 discloses cooling grinding of cement clinker in an air-swept roller mill downstream of a rotary tubular kiln.

U.S. Pat. No. 4,597,537 discloses a vertical mill having an integrated classifier and a mill housing constructed in a defined manner. For improving classifier efficiency, fitted elements are located in the vicinity of the upper grinding area and upstream of the classifier and influence the grinding material-fluid flow. In the vicinity of the classifier there are also tangential gas supplies with which the gas flow in the classifier is regulated. In the wall of the grit cone is provided a further gas supply for the supply of hot gas, in order to bring about a separation of fine particles adhering to the coarse particles with respect to the latter and the return thereof to the classifying area.

For the grinding of slag and mixed cements use is advantageously made of modified Loesche-type roller mills, which can be referred to as 2+2 or 3+3 roller mills. In these vertical mills use is made of roller pairs, in each case comprising a precompressing roller or S-roller (slave roller) and a grinding roller, or M-roller (master roller) (EP 406 644 B1).

When grinding raw material, such as cement clinker, slag and aggregates, the raw material components have different moisture contents and/or different temperatures. Hot cement clinker, which can have temperatures of 120° C. and higher, is ground in cement plants on increasing the capacity of the rotary kilns and when the existing capacity of the clinker cooler is not adequate and/or if the clinker storage in silos or outside storage does not provide an adequate aftercooling time up to the time of grinding, which can particularly arise with on-line production.

When grinding hot cement clinker in vertical mills with slag and wet aggregates the necessary cooling and drying gases deteriorate in their function as carrying gases. Drying gas or hot gas must be supplied at an adequately high temperature and volume, so that the drying process can take place quickly during grinding. The cooling gas, particularly fresh air, is admixed in regulated manner to the hot gas at corresponding feed temperatures, particularly of the cement clinker or slag.

In order to achieve the desired gas and product temperature downstream of the classifier, it is often necessary to inject water into the grinding chamber, e.g. into the coarse material circulation zone. The disadvantages are an increased energy demand due to the necessary cooling water evaporation, a deterioration of the cement quality and increased wear to the grinding parts, together with an increased energy demand at the mill motor.

SUMMARY OF THE INVENTION

The object of the invention is to provide a method and a device for the simultaneous grinding and drying of hot, wet raw material in a vertical mill, so as to ensure an optimum throughput capacity and energy saving and at the same time an improvement in the product quality, particularly in the case of mixed cements.

With respect to the method the object is achieved through the raw material components being fed to a vertical mill, ground and simultaneously dried with the aid of hot gas sup-plied via a nozzle ring to a lower mill part and a predeterminable gas and product temperature downstream of a classifier being maintained with the aid of a cooling medium, wherein the hot gas is supplied with a gas inlet temperature which is determined by the moisture content of the raw material component with the highest moisture level and above the nozzle ring and separately from the hot gas a cooling gas is introduced into the vertical mill and admixed with the grinding material-gas mixture; and with respect to the device having a vertical mill, a classifier and a feed line for hot gas, which passes via a nozzle ring in the lower mill part into grinding area and having at least one supply device for a cooling medium with which it is possible to regulate a predeterminable gas and product temperature downstream of the classifier, wherein the supply devices are designed for a cooling gas serving as a cooling medium and also making up a portion of the carrying gas for the grinding material and are positioned upstream of the classifier in the upper mill part and between the grinding rollers or between the grinding rollers and the slave rollers.

It is a fundamental idea of the inventive method to achieve a high grinding/drying efficiency, in that the temperature level of the hot gas, which is supplied to the mill via the nozzle ring or vane ring, is so adjusted that the milling and drying speeds are the same. This can lead to a maximum milling throughput capacity with a minimum electrical power consumption of the mill, classifier and blower motors.

According to the invention hot gas is supplied with a gas inlet temperature which, apart from taking account of the raw material temperature, is significantly determined by the moisture content of the raw material component with the highest moisture level. According to the invention, for regulating the predetermined classifier outlet temperature of the gas-product mixture, as the cooling medium a cooling gas is introduced into the vertical mill above the nozzle ring and separately from the hot gas and is admixed with the ground material-gas mixture.

An injection of water as the coolant is replaced or at least significantly reduced by the supply of a cooling gas, particularly fresh air from the environment. This leads to the advantage of saving heating energy due to the no longer necessary or reduced cooling water evaporation.

It is advantageous that through the subdivision of the mill gas volume or carrying gas into hot gas, which is supplied to the lower part of the mill, and cooling gas which is supplied to the upper part of the mill, the simultaneous grinding and drying is determined by the hot gas supplied here. Due to the high gas inlet temperatures in the lower area of the upper part of the mill a simultaneous grinding and raw material drying and therefore an optimum mill throughput capacity are possible. Simultaneously, due to the replacement of cooling water by cooling gas, particularly by fresh air or at least partially cooled air, in an energy-optimum manner the necessary product and gas temperature can be regulated after the mill and can advantageously be $\leq 95°$ C.

By obviating cooling water injection or injecting only significantly reduced cooling water quantities, there is a heating energy economy and simultaneously an improvement to the product quality. In addition, there are process advantages for downstream plant equipment, such as bag filters and blowers.

It is appropriate to operate the grinding system with vertical mill, classifier and filter with a mill fan or blower, which produces a necessary volume flow. Generally the grinding system is vacuum-operated, so that advantageously ambient air can be sucked as cooling gas into the upper mill area.

As a function of the feed temperature of the raw material components and the moisture content, it can be appropriate to supply the vertical mill with hot gas at an inlet temperature >180° C., e.g. approximately 230° C.

It has been found that a subdivision of the overall mill volume or the carrying gas in such a way that up to 70% of the volume flow is supplied as hot gas to the lower part of the mill and up to 30% as cooling gas, particularly fresh air, to the upper part of the mill, is advantageous for optimizing the mill drying efficiency of a cement clinker and slag grinding and supplied aggregates. The total gas quantity of the vertical mill is regulated by a mill fan action and measurements downstream of the filter.

Appropriately the cooling gas is introduced into the upper mill part with a swirling flow into the grinding area corresponding to the rising grinding material-gas mixture. Relative to the grinding rollers rolling on the grinding pan and optionally present slave rollers, it is appropriate to have the supply of cooling gas in an area between the grinding rollers or between a grinding roller and a slave roller.

It is also advantageous to measure the hot gas inlet temperature upstream of the vertical mill and to regulate it by a hot gas generator and/or by a gas supply from neighbouring processes, e.g. from a clinker cooler, and/or by the return of waste gases downstream of the filter and mill fan.

The inventive device for grinding hot, wet raw material, particularly cement clinker, slag and aggregates, has a grinding system with a vertical mill, a classifier and a feed line for hot gas, as well as at least one supply device for a cooling medium for regulating a predetermined gas and product temperature downstream of the classifier, the supply devices being designed for a cooling gas, preferably fresh air from the environment and above the nozzle ring and positioned upstream of the classifier in the upper mill part and between the grinding rollers or between the grinding rollers and slave rollers.

Appropriately the supply devices are swirl boxes equipped with adjustable swirl flaps for regulating the cooling air quantities as a function of the desired temperature value downstream of the classifier.

Downstream of the classifier the grinding system has a filter, e.g. a bag filter, and a downstream mill fan, which with a relatively high suction capacity ensures a vacuum or suction operation in the mill, classifier and filter and advantageously permits an intake into the upper part of the mill of ambient air. Optionally there can be an additional blower for the cooling gas supply.

Appropriately there is a controlled system for cooling gas supply, in which the gas and product temperature downstream of the classifier is a controlled variable.

Combined with said controlled system advantageously there is a second controlled system, which controls the hot gas quantity and temperature in the vertical mill. The controlled variables can be the maximum moisture content of a raw material component and the hot gas temperature in the feed line to the vertical mill.

Appropriately the swirl flaps of the swirl boxes are set up for a tangential cooling gas supply to ensure that the cooling gas has virtually the same flow direction as the rising grinding material-gas mixture.

BRIEF DESCRIPTION OF THE DRAWINGS

The invention is described in greater detail hereinafter relative to embodiments and with reference to the attached highly diagrammatic drawings, wherein show.

DETAILED DESCRIPTION OF THE PREFERRED EMBODIMENTS

Figure 1:
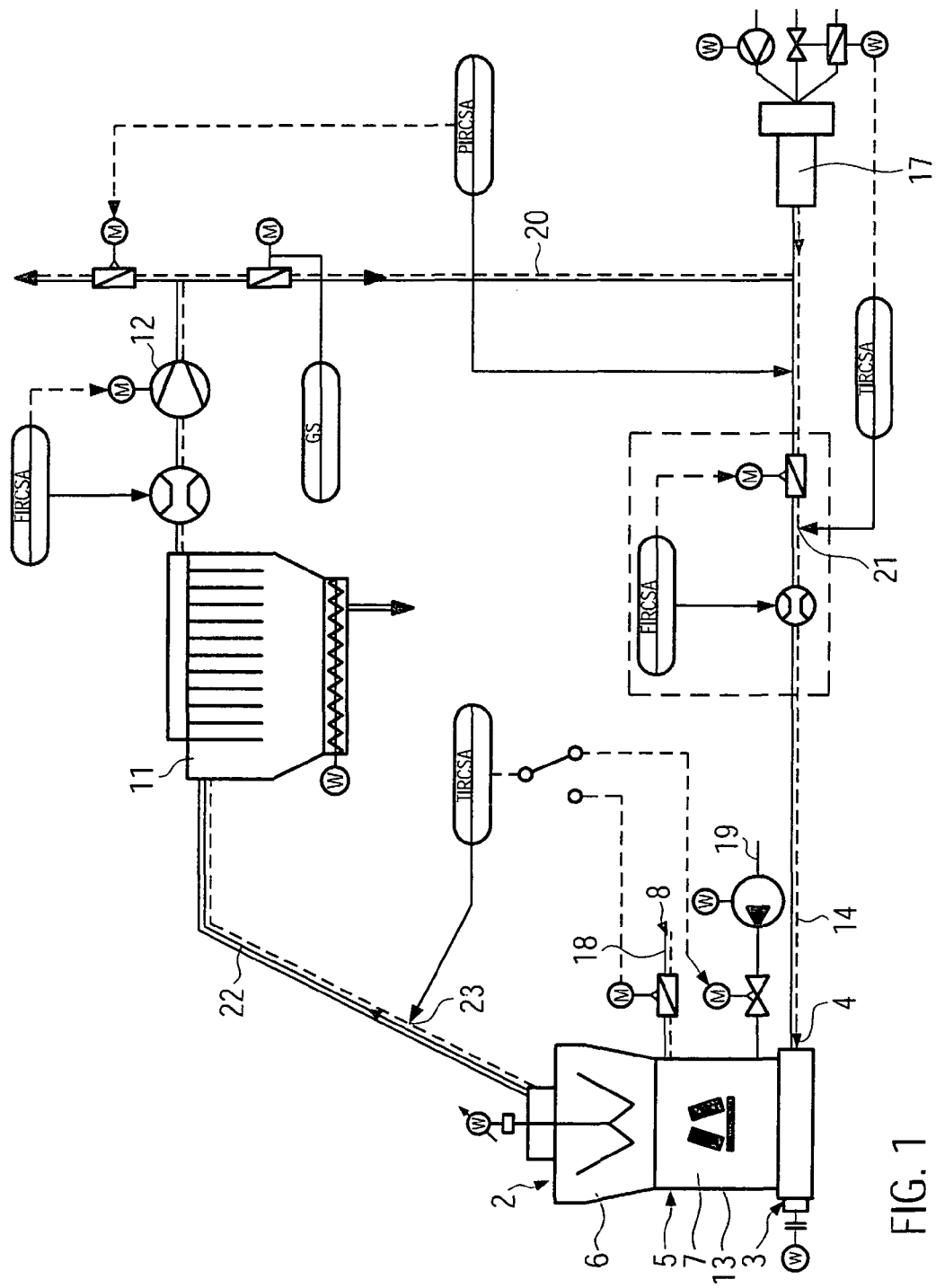
FIG. 1 A plant diagram for a device according to the invention.

FIG. 1 shows a grinding system with an inventive vertical mill 2 in the form here of a Loesche-type air-swept roller mill and having an integrated classifier 6. In highly diagrammatic manner is shown a supply of hot gas 4 via a hot gas feed line 14 in the lower mill part 3 and a supply of cooling gas 8 in the upper mill part 5. There is a separate supply, particularly of max 70% hot gas 4 and max 30% cooling gas 8 to the grinding area 7. The hot gas 4 and cooling gas 8 form the supporting or carrying gas for the mill drying process.

The hot gas 4 is in per se known manner supplied by means of a nozzle or vane ring (not shown) surrounding a grinding pan in the lower mill part 3 and is used for the drying of the raw materials, e.g. cement clinker, slag and wet aggregates (not shown) supplied via a not shown feed mechanism, as well as the pneumatic conveying of a portion of the grinding material-gas mixture into the classifier 6.

A temperature measuring device 21 is positioned upstream of the vertical mill 2 in the hot gas feed line 14 for controlling the hot gas supply, and as a function of the quantity, wetness and temperature of the supplied raw material components and the predetermined gas and product temperature downstream of the classifier 6, the temperature and volume of the hot gas 4 are controlled.

The hot gas line 14 is connected to a return line 20 for the waste gas from filter 11, which is connected downstream of the vertical mill 2 with classifier 6, so that part of the waste gas can be admixed with the hot gas 4 from a hot gas generator 17.

The hot gas 4 fed to the vertical mill 2 together with the cooling gas 8 supplied to the upper mill part 5 and which is in particular fresh or ambient air, forms the carrying gas with which the grinding material is conveyed in the rising grinding material-gas mixture to the classifier 6 and via a connecting line 22 to filter 11.

A mill fan 12 downstream of filter 11 has the necessary suction capacity and ensures a vacuum in vertical mill 2, classifier 6 and filter 11, so that advantageously the cooling air 8 necessary for a predetermined gas and product temperature downstream of the classifier 6 can be sucked in. The cooling air 8 passes via supply devices 18, which are located in or on the mill housing 13 of the upper mill part 5, into the grinding area or chamber 7.

A controlled system with a temperature measuring device 23 is positioned downstream of classifier 6 in connecting line 23 for controlling the cooling gas or fresh air supply.

In order in the case of particularly high raw material, e.g. cement clinker inlet temperatures to ensure the desired gas and product temperature downstream of the classifier, a cooling water supply 19 is provided in grinding area 7. However, the controllable water injection is greatly reduced and is essentially replaced by the fresh air supply in the upper mill part 5.

Figure 2:
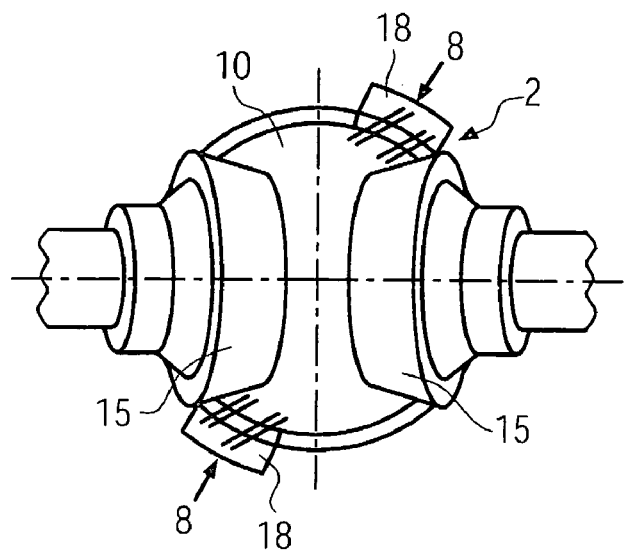
FIG. 2 A plan view of the grinding pan of an inventive vertical mill.

FIG. 2 shows in highly diagrammatic form the arrangement of supply devices 18 for the cooling gas 8 in the upper mill part.

Here the supply devices 8 are swirl boxes, whose swirl flaps can be set for a controlled tangential supply or swirling flow corresponding to the rising grinding material-gas flow in grinding area 7 (FIG. 1).

On a grinding pan 10 roll two grinding rollers 15 and in the area between the grinding rollers 15 are provided two swirl boxes 18 as supply devices for fresh air 8 in or on mill housing 13 (cf. FIG. 1).

Figure 3:
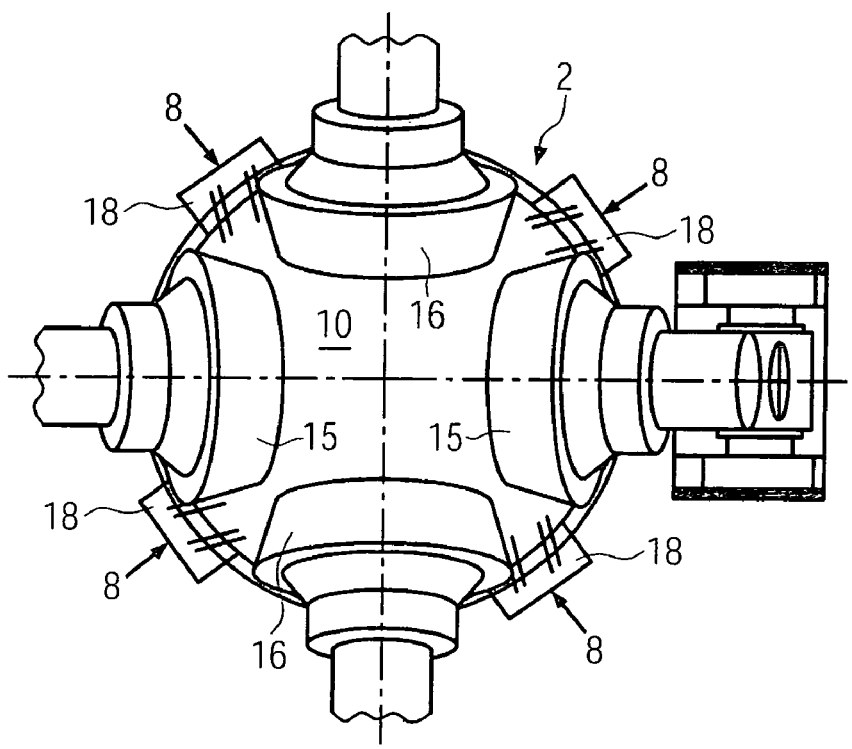
FIG. 3 A plan view of the grinding pan of an inventive 2+2 roller mill.

FIG. 3 shows in highly diagrammatic form a detail of a 2+2 roller mill, in which two grinding rollers 15 and two slave rollers 16 roll on a grinding pan 10. Between each slave roller 16 and each grinding roller 15 are provided in the upper mill part 5 supply devices 18 for a controlled supply of the cooling gas 8 corresponding to the swirling flow of the rising grinding material-gas mixture.

The invention claimed is:

1. Method for grinding hot, wet raw material, including cement clinker, slag and aggregates, using a vertical mill (2) having a lower mill part (3) and an upper mill part (5) above the lower mill part (3), the upper mill part (5) including a grinding area (7), the lower mill part (3) having a nozzle ring therein, and the raw material having a plurality of components, the method comprising the steps of:
   feeding raw material components to the vertical mill (2),
   supplying only a hot gas (4) to the lower mill part (3) via the nozzle ring with a gas inlet temperature which is determined by the moisture content of the raw material component with the highest moisture level,
   creating a grinding material-hot gas mixture by grinding and simultaneously drying the raw material components in the upper mill part (5) with the aid of the hot gas (4) supplied via the nozzle ring to the lower mill part (3), and
   introducing a cooling gas (8) separately from the hot gas (4) into the grinding area (7) of the upper mill part (5) of the vertical mill (2) above the nozzle ring, and admixing the cooling gas (8) with the grinding material-hot gas mixture upstream of a classifier (6) above the upper mill part (5), wherein the cooling gas (8) serves as a cooling medium maintaining a predeterminable gas and product temperature downstream of the classifier (6) and also makes up a portion of the carrying gas which carries the grinding material-hot gas mixture to the classifier (6).

2. Method according to claim 1,
wherein,
relative to the total carrying gas quantity in the vertical mill (2), up to 30% cooling gas (8) is supplied to the upper mill part (5) of vertical mill (2).

3. Method according to claim 1,
wherein
in the step of introducing a cooling gas (8), fresh air is supplied as cooling gas (8).

4. Method according to claim 1,
wherein
in the step of introducing a cooling gas (8), at least partially cooled air is supplied as the cooling gas (8).

5. Method according to claim 1,
further comprising the steps of:
presetting a gas and product temperature of $\leq 95°$ C. downstream of the classifier (6) and maintaining the preset gas and product temperature by a controlled supply of cooling gas (8).

6. Method according to claim 1, further comprising the step of:
supplying a vacuum in the vertical mill (2), the classifier (6), and a filter (11) and sucking in ambient air as the cooling gas (8).

7. Method according to claim 6,
wherein
in the step of supplying a vacuum, the vacuum is produced by a mill fan (12) with a necessary volume flow and which is connected downstream of the filter (11).

8. Method according to claim 1,
wherein
in the step of supplying a hot gas (4), the hot gas (4) is supplied to the vertical mill (2) with an inlet temperature >180° C.

9. Method according to claim 8, wherein the hot gas (4) is supplied to the vertical mill (2) with an inlet temperature around 230° C.

10. Method according to claim 1,
wherein
the hot gas inlet temperature in the vertical mill (2) is controlled as a function of the quantity and moisture content of the overall or individual components of the raw material.

11. Method according to claim 1,
wherein
up to 70% of the volume flow in the vertical mill (2) is supplied as hot gas (4).

12. Method according to claim 1, further comprising the step of:
controlling the total gas quantity of the vertical mill (2) by measurement downstream of a filter (11) and action on a mill fan (12).

13. Method according to claim 1,
wherein
in the step of introducing a cooling gas (8), the cooling gas (8) is introduced into the grinding area (7) with a swirling flow corresponding to the rising grinding material-gas mixture.

14. Method according to claim 1,
wherein the vertical mill (2) includes a mill housing (13) and wherein the grinding area (7) has grinding rollers (15), and
in the step of introducing a cooling gas (8), the cooling gas (8) is introduced into the grinding area (7) via supply devices (18) in the mill housing (13) and which are located in the vicinity of the upper mill part (5) and between the grinding rollers (15).

15. Method according to claim 1, further comprising the steps of:
measuring the inlet temperature of the hot gas upstream of the vertical mill (2) and controlling the inlet temperature of the hot gas by at least one of a hot gas generator (17)

and a gas supply from neighbouring processes and a return of the hot gas downstream of a mill fan (12).

16. Method according to claim 1,
wherein the vertical mill (2) includes a mill housing (13) and wherein the grinding area (7) has grinding rollers (15) and slave rollers (16), and in the step of introducing a cooling gas (8), the cooling gas (8) is introduced into the grinding area (7) via supply devices (18) in the mill housing (13) and which are located in the vicinity of the upper mill part (5) and between the grinding rollers (15) and the slave rollers (16).

\* \* \* \* \*